United States Patent
Sakai et al.

(10) Patent No.: US 10,112,475 B2
(45) Date of Patent: Oct. 30, 2018

(54) UTILITY VEHICLE

(71) Applicant: Kubota Corporation, Osaka-shi (JP)

(72) Inventors: Masatoshi Sakai, Sakai (JP); Hiroki Bessho, Sakai (JP); Kazuyuki Tashiro, Sakai (JP)

(73) Assignee: Kubota Corporation, Osaka (JP)

( * ) Notice: Subject to any disclaimer, the term of this patent is extended or adjusted under 35 U.S.C. 154(b) by 16 days.

(21) Appl. No.: 15/355,628

(22) Filed: Nov. 18, 2016

(65) Prior Publication Data

US 2017/0158044 A1 Jun. 8, 2017

(30) Foreign Application Priority Data

Dec. 7, 2015 (JP) ................................ 2015-238679

(51) Int. Cl.
| | |
|---|---|
| B60K 6/52 | (2007.10) |
| B60L 11/12 | (2006.01) |
| B60W 20/40 | (2016.01) |
| B60L 11/14 | (2006.01) |
| B60K 6/485 | (2007.10) |
| B60W 20/00 | (2016.01) |

(52) U.S. Cl.
CPC .............. B60K 6/52 (2013.01); B60L 11/123 (2013.01); B60L 11/14 (2013.01); B60W 20/40 (2013.01); B60K 6/485 (2013.01); B60W 20/00 (2013.01); B60W 2300/18 (2013.01); B60W 2540/06 (2013.01); B60W 2540/10 (2013.01); B60W 2540/16 (2013.01); B60Y 2200/92 (2013.01); *Y02T 10/6226* (2013.01); *Y02T 10/6265* (2013.01); *Y10S 903/916* (2013.01)

(58) Field of Classification Search
CPC ......... B60K 6/52; B60K 6/485; B60L 11/123; B60L 11/14; B60W 20/40; B60W 20/00
See application file for complete search history.

(56) References Cited

U.S. PATENT DOCUMENTS

| | | | |
|---|---|---|---|
| 7,497,286 B2 * | 3/2009 | Keller | B60K 6/48 180/65.6 |
| 9,278,687 B2 | 3/2016 | Kimata et al. | |
| 2007/0219047 A1 | 9/2007 | Nakatani et al. | |

(Continued)

FOREIGN PATENT DOCUMENTS

| | | |
|---|---|---|
| JP | 614218 U | 1/1986 |
| JP | 2101903 A | 4/1990 |

(Continued)

*Primary Examiner* — Joseph M Rocca
*Assistant Examiner* — Marlon A Arce
(74) *Attorney, Agent, or Firm* — The Webb Law Firm (57) ABSTRACT

A utility vehicle includes: a travel unit having a left-right pair of front travel apparatuses and a left-right pair of rear travel apparatuses; an engine capable of driving first travel apparatuses being one of the pair of front travel apparatuses and the pair of rear travel apparatuses; a motor capable of driving second travel apparatuses being the other of the pair of front travel apparatuses and the pair of rear travel apparatuses; and a control apparatus capable of switching between an engine two-wheel drive mode in which only the engine is driven, a motor two-wheel drive mode in which only the motor is driven, and a hybrid four-wheel drive mode in which the engine and the motor are both driven.

5 Claims, 7 Drawing Sheets

(56) References Cited

U.S. PATENT DOCUMENTS

| | | | |
|---|---|---|---|
| 2013/0036862 A1* | 2/2013 | Keller | B60K 6/442 74/661 |
| 2016/0144739 A1* | 5/2016 | Ando | B60K 1/02 701/22 |
| 2016/0185207 A1* | 6/2016 | Gerschutz | B60K 6/52 180/243 |

FOREIGN PATENT DOCUMENTS

| | | | |
|---|---|---|---|
| JP | 7052673 | A | 2/1995 |
| JP | 2002321542 | A | 11/2002 |
| JP | 2007239978 | A | 9/2007 |
| JP | 2008213713 | A | 9/2008 |
| JP | 2011046300 | A | 3/2011 |
| JP | 2013203295 | A | 10/2013 |

* cited by examiner

| | Off state M1 | Standby state M2 | Motor two-wheel drive mode M3 | Engine two-wheel drive mode M4 | Hybrid four-wheel drive mode M5 |
|---|---|---|---|---|---|
| Key switch 25 | Off position P1 | On position P2 | On position P2 | On position P2 | On position P2 |
| Power supply to electrical system | No | Yes | Yes | Yes | Yes |
| Drive switching switch 26 | — | Off state Q1 | On state Q2 | Off state Q1 | On state Q2 |
| Engine 12 | Non-driving state | Non-driving state | Non-driving state | Driving state | Driving state |
| Rear wheels 18 | Non-driving state | Non-driving state | Non-driving state | Drivable state | Drivable state |
| Motor 13 | Non-driving state | Non-driving state | Drivable state | Non-driving state | Drivable state |
| Clutch 21 | Disengaged state | Disengaged state | Engaged state | Disengaged state | Engaged state |
| Front wheels 19 | Non-driving state | Non-driving state | Drivable state | Non-driving state | Drivable state |
| Gearshift lever 27 | Disabled | Disabled | Disabled | Enabled | Enabled |
| Forward-reverse travel switching switch 28 | Disabled | Disabled | Enabled | Disabled | Disabled |

UTILITY VEHICLE

CROSS-REFERENCE TO RELATED APPLICATION

This application claims priority to Japanese Patent Application No. 2015-238679 filed Dec. 7, 2015, the disclosure of which is hereby incorporated in its entirety by reference.

BACKGROUND OF THE INVENTION

Field of the Invention

For example, in JP 2007-239978A, a conventional utility vehicle provided with a travel unit having a left-right pair of front travel apparatuses (in the same document, 'front wheels') and a left-right pair of rear travel apparatuses (in the same document, 'rear wheels') is described. In this utility vehicle, an engine capable of driving the front travel apparatuses and the rear travel apparatuses is provided.

However, in the conventional technology, because the engine is the power source of both the front travel apparatuses and the rear travel apparatuses, there are disadvantages such as an increased environmental burden due to exhaust of the engine, and increased fuel consumption.

In consideration of the above circumstances, it has been desired to provide a utility vehicle capable of achieving a reduction in environmental burden and a reduction in fuel consumption.

SUMMARY OF THE INVENTION

A utility vehicle of the present invention includes:

a travel unit having a left-right pair of front travel apparatuses and a left-right pair of rear travel apparatuses;

an engine capable of driving first travel apparatuses being one of the pair of front travel apparatuses and the pair of rear travel apparatuses;

a motor capable of driving second travel apparatuses being the other of the pair of front travel apparatuses and the pair of rear travel apparatuses; and a control apparatus capable of switching between an engine two-wheel drive mode in which only the engine is driven, a motor two-wheel drive mode in which only the motor is driven, and a hybrid four-wheel drive mode in which the engine and the motor are both driven.

According to the present invention, the power source of the front travel apparatuses and the power source of the rear travel apparatuses are individually provided separate from each other.

In the engine two-wheel drive mode, only the engine is driven, and by the driving force of the engine, only the first travel apparatuses being one of the pair of front travel apparatuses and the pair of rear travel apparatuses are driven.

Also, in the motor two-wheel drive mode, only the motor is driven, and by the driving force of the motor, only the second travel apparatuses being the other of the pair of front travel apparatuses and the pair of rear travel apparatuses are driven.

Also, in the hybrid four-wheel drive mode, the engine and the motor are both driven, and by the driving force of the engine, the first travel apparatuses are driven, and by the driving force of the motor, the second travel apparatuses are driven.

That is, an operator, by switching between the engine two-wheel drive mode, the motor two-wheel drive mode, and the hybrid four-wheel drive mode, can freely select an appropriate mode of travel according to circumstances.

For example, in a case such as where there is insufficient electrical power to drive the motor, by using the engine two-wheel drive mode, it is possible to avoid hindering travel.

Also, for example, in a case such as where a large amount of traveling torque is not needed, such as on flat ground, by using the motor two-wheel drive mode, the engine is not driven, so quiet travel is possible, and without emitting exhaust from the engine it is possible to achieve a reduction in the environmental burden, and furthermore, it is possible to achieve a reduction in fuel consumption.

Also, for example, in a case such as traveling on a slope while carrying a load, by using the hybrid four-wheel drive mode, an adequate amount of traveling torque is insured by the driving force of the engine and the driving force of the motor, and so it is possible to travel in such a manner that inadequate traveling torque is unlikely to occur.

That is, according to the present invention, by effectively utilizing the motor two-wheel drive mode as necessary, it is possible to achieve a reduction in the environmental burden and a reduction in fuel consumption.

In the above configuration, it is preferable to provide:

a transmission apparatus capable of performing a gearshift of driving force of the engine and transmitting the driving force to the first travel apparatuses;

an accelerator operation tool capable of operation to input a change in rotational speed of at least one of the engine and the motor;

a key switch capable of operation to input driving and stoppage of the engine;

a drive switching switch capable of operation input commands to drive and stop the motor;

a gearshift lever capable of operation input to perform a gearshift of the transmission apparatus; and a forward-reverse travel switching means capable of operation input to switch between forward travel driving and reverse travel driving of the motor in the motor two-wheel drive mode.

According to this configuration, the key switch capable of operation to input driving and stoppage of the engine, and the drive switching switch capable of operation input commands to drive and stop the motor, are individually provided separate from each other.

Also, in the engine two-wheel drive mode and the hybrid four-wheel drive mode, a gearshift of the transmission apparatus that transmits the driving force of the engine to the first travel apparatuses is performed by operating the gearshift lever.

On the other hand, in the motor two-wheel drive mode, switching between forward travel driving and reverse travel driving of the motor is performed by operating the forward-reverse travel switching means provided separate from the gearshift lever.

A change in the rotational speed of the engine in the engine two-wheel drive mode, the rotational speed of the motor in the motor two-wheel drive mode, and the rotational speed of the engine and the motor in the hybrid four-wheel drive mode are performed by operating the accelerator operation tool.

In this way, the operating system related to the engine and the operating system related to the motor are basically separate except for the accelerator operation tool, so the possibility of mistaken operation by the operator is reduced, and it is possible to avoid a problem such as an unintended starting movement of the traveling machine body by the operator, for example.

In the above configuration, it is preferable that:

the control apparatus is configured so as to perform switching between forward travel driving and reverse travel driving of the motor based on operation of the gearshift lever in the hybrid four-wheel drive mode.

According to this configuration, in the hybrid four-wheel drive mode, by operating the gearshift lever, a gearshift of the transmission apparatus that transmits the driving force of the engine to the first travel apparatuses is performed, and also, linked with the gearshift of the transmission apparatus, switching between forward travel driving and reverse travel driving of the motor that drives the second travel apparatuses is performed. Therefore, in the hybrid four-wheel drive mode, for example, it is not necessary for the operator to operate the gearshift lever and the forward-reverse travel switching means with separate hands, and so it is possible to preferably change the driving states of the first travel apparatuses and the second travel apparatuses by only operating the gearshift lever.

In the above configuration, it is preferable that:

a steering wheel capable of operation input of steering of the travel unit is provided, and the forward-reverse travel switching means is provided at a location on the opposite side in the left-right direction as the gearshift lever, relative to the steering wheel.

According to this configuration, the operator operates the gearshift lever in the engine two-wheel drive mode, and operates the forward-reverse travel switching means in the motor two-wheel drive mode, and the gearshift lever and the forward-reverse travel switching means are disposed divided on both the left and right sides of the steering wheel, which is operated by the operator grasping the steering wheel with both hands. That is, the operator performs operation of the gearshift lever in the engine two-wheel drive mode, and operation of the forward-reverse travel switching means in the motor two-wheel drive mode, respectively, with left and right different hands. Therefore, the possibility of mistaken operation by the operator is reduced, and it is possible avoid a problem such as an unintended starting movement by the operator.

In the above configuration, it is preferable that:

the forward-reverse travel switching means is provided in a grip unit of the gearshift lever.

According to this configuration, the forward-reverse travel switching means is disposed in a smaller space than in a case where the forward-reverse travel switching means is provided at a location unrelated to the gearshift lever, so there is more freedom in the layout of the operating system. Further, because the operator performs hand operation of the gearshift lever and finger operation of the forward-reverse travel switching means provided in the grip unit of the gearshift lever with the same hand, operation becomes easier to perform.

In the above configuration, it is preferable that:

in the engine two-wheel drive mode, a gearshift of the transmission apparatus is performed by a movement operation in a first direction of the gearshift lever, and in the motor two-wheel drive mode, the gearshift lever functions as the forward-reverse travel switching means, and switching between forward travel driving and reverse travel driving of the motor is performed by a movement operation in a second direction orthogonal to the first direction of the gearshift lever.

According to this configuration, it is not necessary to provide a forward-reverse travel switching means separate from the gearshift lever, so the configuration can be simplified. Also, the first direction that is the direction of operation of the gearshift lever in the engine two-wheel drive mode, and the second direction that is the direction of operation of the gearshift lever in the motor two-wheel drive mode, are different directions orthogonal to each other, so while allowing the operator to operate the same gearshift lever in the engine two-wheel drive mode and the motor two-wheel drive mode, it is possible to have a different feeling of operation in each mode.

BRIEF DESCRIPTION OF THE DRAWINGS

FIG. 6 is a back view showing the arrangement of a forward-reverse travel drive switching switch and the like.

DETAILED DESCRIPTION OF THE PREFERRED EMBODIMENTS

Following is a description of exemplary embodiments of the present invention with reference to the drawings.

First Embodiment

Following is a description of a first embodiment.

Figure 1:
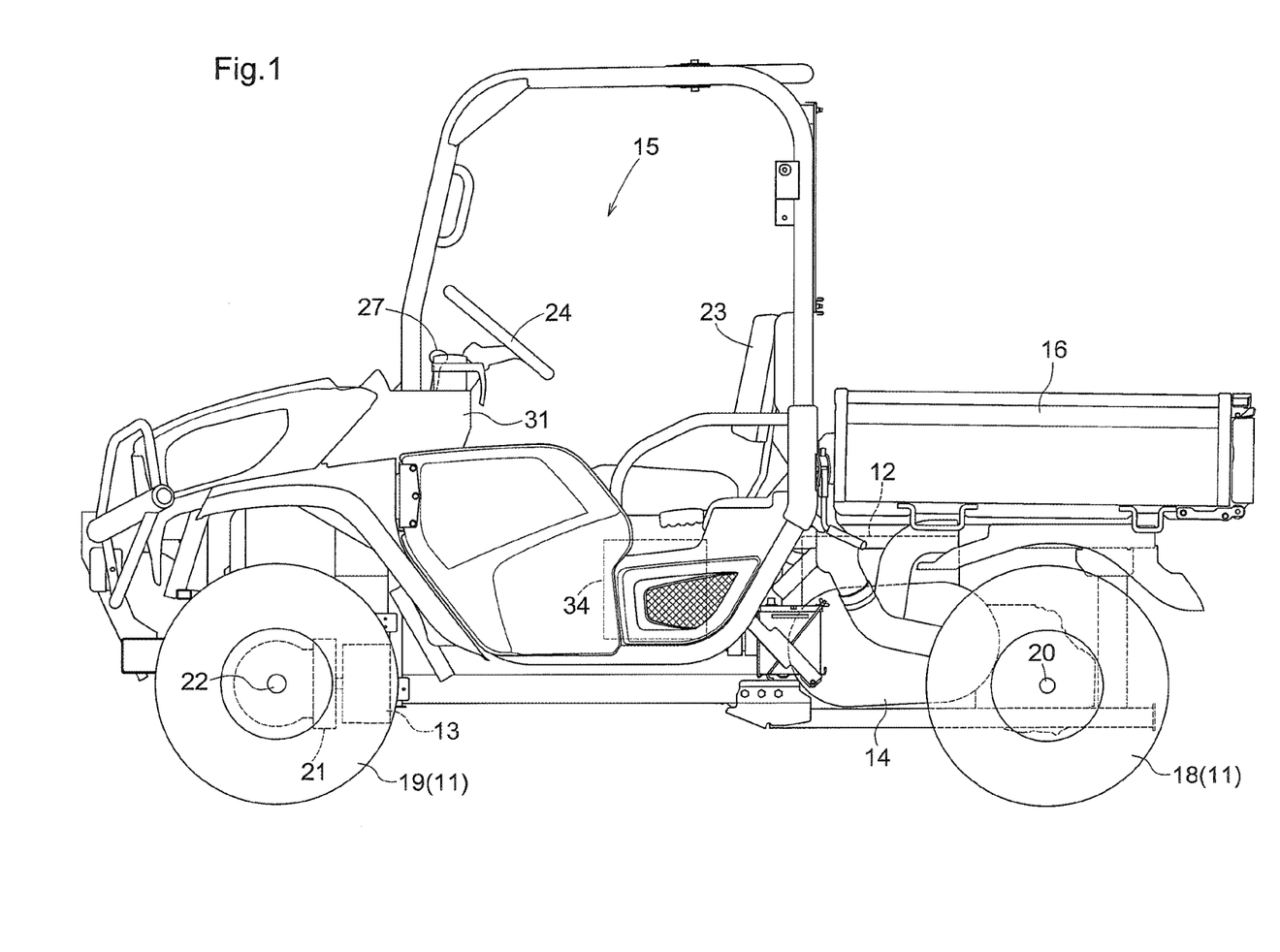
FIG. 1 is a side view of a utility vehicle.
Figure 2:
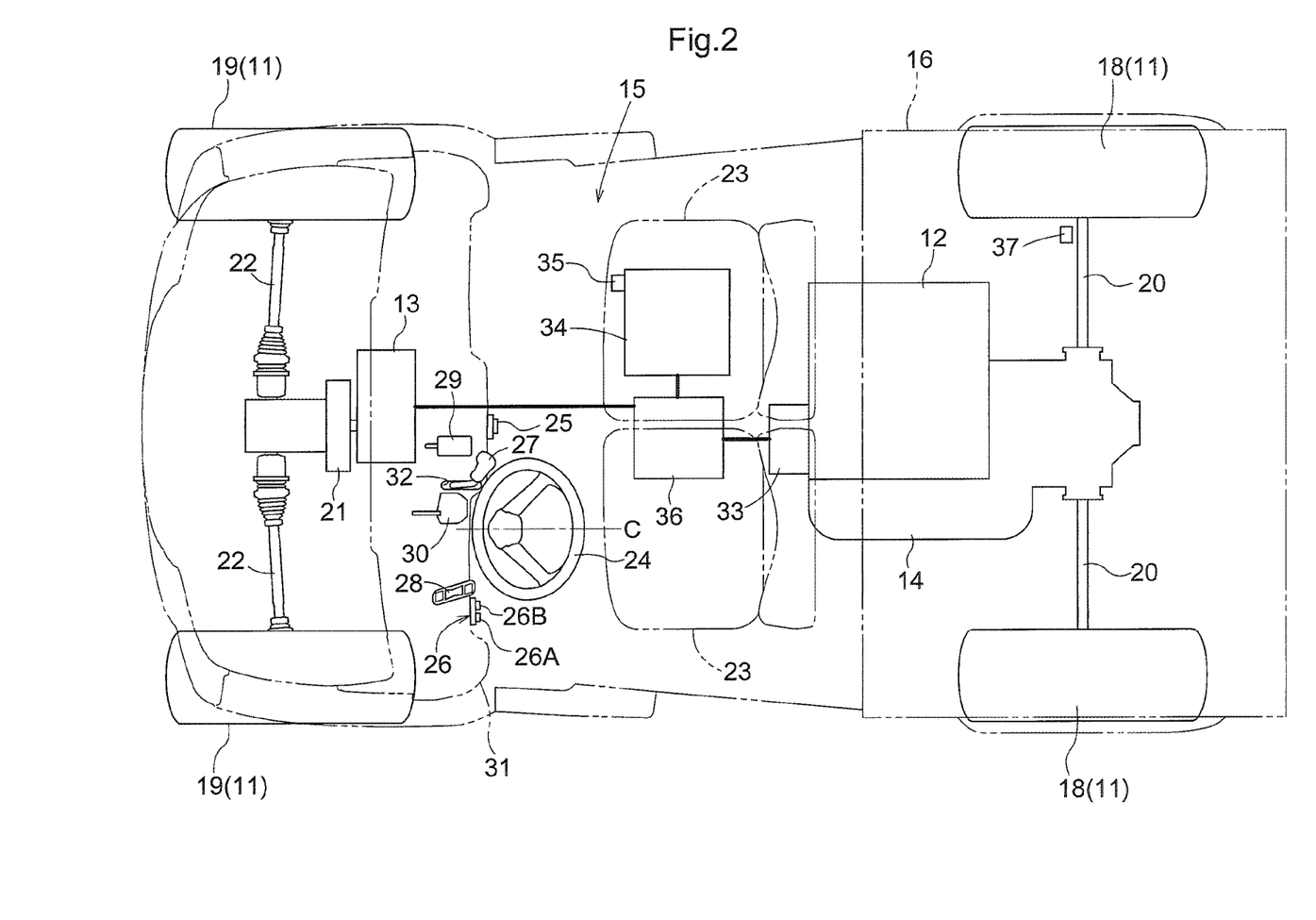
FIG. 2 is a schematic diagram showing a plan view of a power transmission structure in the utility vehicle.

In a traveling machine body of a utility vehicle shown in FIGS. 1 and 2, there are provided a travel unit 11 for travel, an engine 12 serving as a power source, a motor 13 serving as another power source different from the engine 12, a transmission apparatus 14 having a gear mechanism or the like, an operation unit 15 in which a rider rides, a cargo bed 16 where cargo can be loaded, and a control apparatus 17 configured to perform control of the engine 12, the motor 13, and the like (see FIG. 3), for example.

As shown in FIGS. 1 and 2, a left-right pair of rear wheels 18 (examples of 'rear travel apparatuses' and 'first travel apparatuses') and a steerable left-right pair of front wheels 19 (examples of 'front travel apparatuses' and 'second travel apparatuses') are provided in the travel unit 11.

As shown in FIG. 1, the engine 12 is configured so as to be capable of driving the rear wheels 18 through the transmission apparatus 14 and rear axles 20. The motor 13 is configured so as to be capable of driving the front wheels 19 through a clutch 21 capable of switching between an engaged state and a disengaged state and front axles 22. Between the motor 13 and the front axle 22 an unshown reduction gear that reduces the rotational speed of the motor 13 is provided. In this way, the power source (the motor 13) of the front wheels 19 and the power source (the engine 12) of the rear wheels 18 are individually provided separate from each other.

The transmission apparatus 14 shown in FIG. 2 is configured so as to be capable of changing the driving force of the engine 12 and transmitting that driving force to the rear wheels 18 through the rear axles 20.

Figure 6:
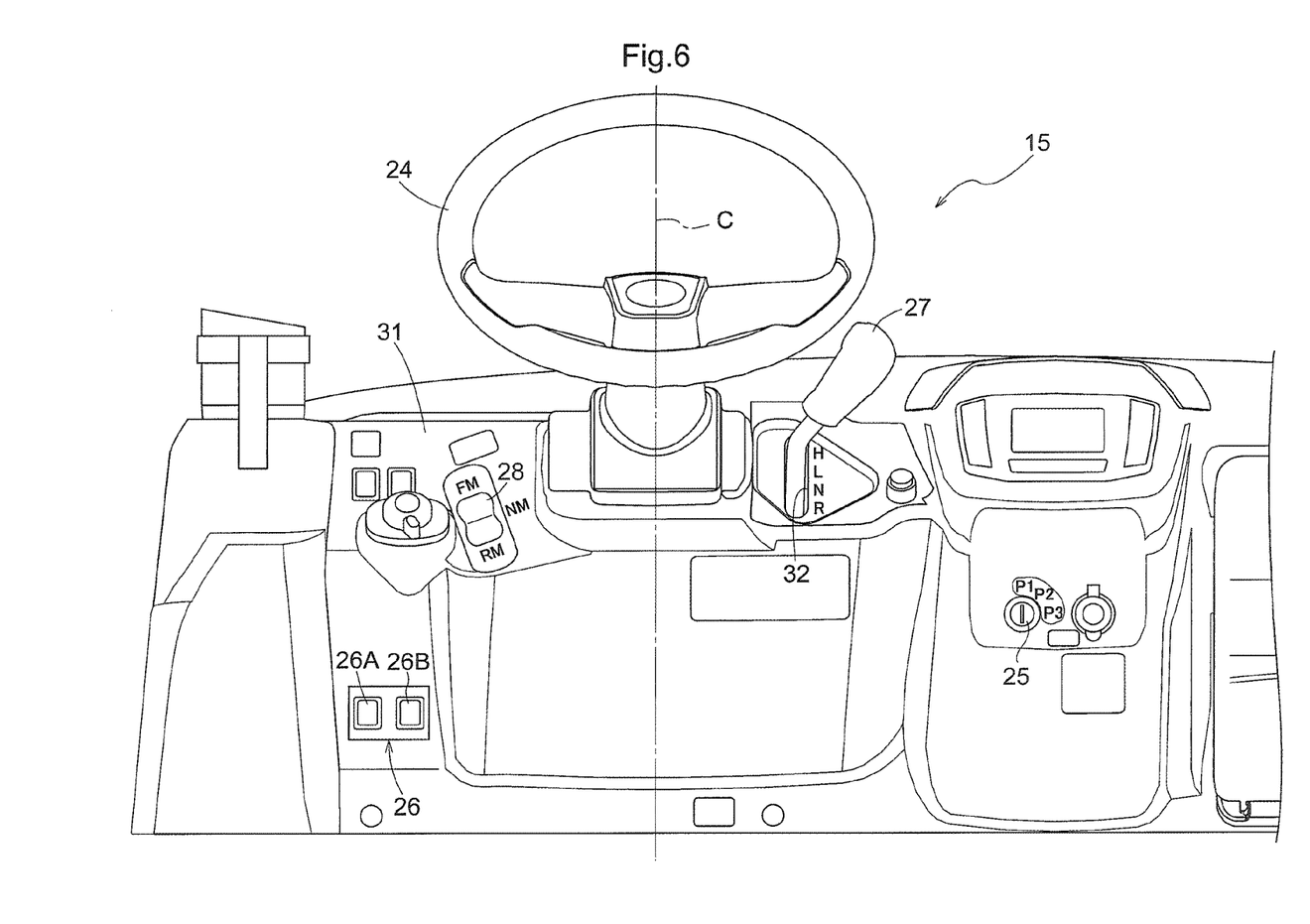

As shown in FIG. 1, the operation unit 15 is positioned in a center portion in the front-rear direction of the traveling machine body, and is disposed forward of the cargo bed 16. As shown in FIGS. 1, 2, and 6, provided in the operation unit 15 are a seat 23 where an operator can sit, a steering wheel 24, a key switch 25, a drive switching switch 26, a gearshift lever 27, a forward-reverse travel switching switch 28 (an example of a 'forward-reverse travel switching means'), an accelerator pedal 29 operated by the operator stepping on the pedal with a foot (an example of an 'accelerator operation tool'), a brake pedal 30 operated by the operator stepping on the pedal with a foot, and the like.

As shown in FIGS. 1, 2, and 6, the steering wheel 24, the key switch 25, the drive switching switch 26, the gearshift lever 27, and the forward-reverse travel switching switch 28 are provided in an operation panel 31 positioned forward of the seat 23.

The steering wheel 24 shown in FIGS. 1, 2, and 6 is configured so as to be capable of operation input of steering of the front wheels 19 in the travel unit 11. As shown in FIGS. 2 and 6, the steering wheel 24 is disposed at a location offset to the left side in the forward direction relative to the center in the left-right direction of the traveling machine body.

Figure 3:
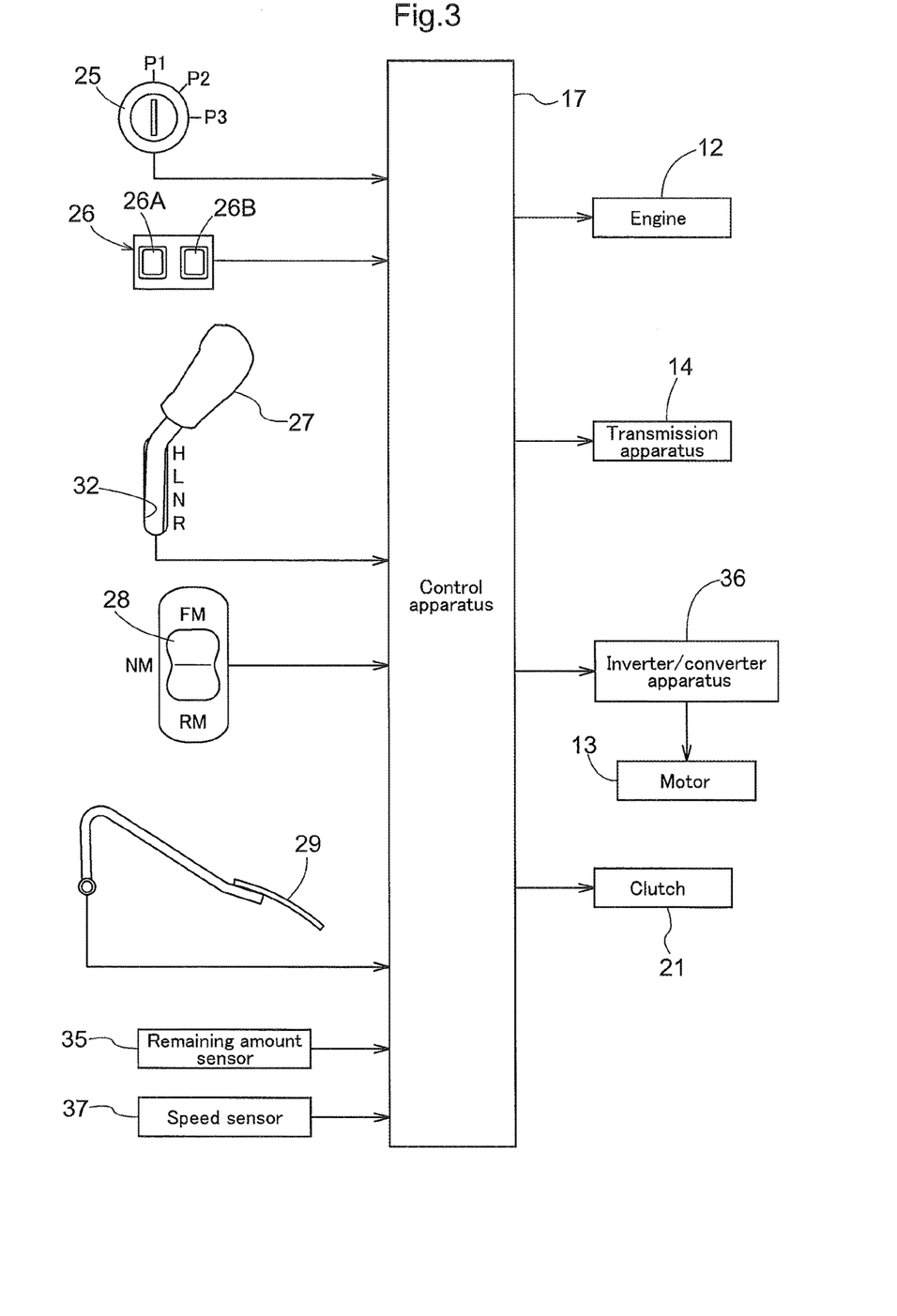
FIG. 3 is a block diagram showing a control configuration.

The key switch 25 shown in FIGS. 2, 3, 6, and the like is configured so as to be capable of operation input of driving and stopping of the engine 12. As shown in FIGS. 3 and 6, the key switch 25 is configured so as to be operable between an off position P1, an on position P2, and a start position P3. When the operator operates the key switch 25 to the off position P1, the engine 12 is set to a stopped state. When the operator operates the key switch 25 from the off position P1 to the on position P2, electrical power is supplied to an electrical system, with the engine 12 remaining in the stopped state. When the operator operates the key switch 25 from the on position P2 to the start position P3, the engine 12 is started. The key switch 25 is biased such that when the operator removes their hand from the start position P3, the key switch 25 automatically returns to the on position P2.

The drive switching switch 26 shown in FIGS. 2, 3, 6, and the like is configured so as to be capable of operation input commands to drive and stop the motor 13. As shown in FIGS. 2, 3, and 6, a push-type two-wheel drive button unit 26A and a push-type four-wheel drive button unit 26B are provided in the drive switching switch 26. When the two-wheel drive button unit 26A is pushed, the drive switching switch 26 is set to an off state Q1. On the other hand, when the four-wheel drive button unit 26B is pushed, the drive switching switch 26 is set to an on state Q2.

The gearshift lever 27 shown in FIGS. 2, 3, 6, and the like is configured so as to be capable of operation input of a gearshift of the transmission apparatus 14. As shown in FIGS. 3 and 6, the gearshift lever 27 is configured so as to be capable of swinging along a lever guide groove 32. The gearshift lever 27 is capable of changing positions to a reverse travel position R, a neutral position N, a low gear forward travel position L, and a high gear forward travel position H. When the gearshift lever 27 is set to the neutral position N, the transmission apparatus 14 is set to a neutral state. When the gearshift lever 27 is set to the low gear forward travel position L, the transmission apparatus 14 is set to a low gear forward travel state. When the gearshift lever 27 is set to the high gear forward travel position H, the transmission apparatus 14 is set to a high gear forward travel state having a smaller gear ratio than the low gear forward travel state. When the gearshift lever 27 is set to the reverse travel position R, the transmission apparatus 14 is set to a reverse travel state.

The forward-reverse travel switching switch 28 shown in FIGS. 2, 3, 6, and the like is capable of operation to a reverse travel position RM and a forward travel position FM. The forward-reverse travel switching switch 28 is biased such that when the operator removes their hand from the reverse travel position RM or the forward travel position FM, the forward-reverse travel switching switch 28 automatically returns to a neutral position NM between the reverse travel position RM and the forward travel position FM. When the forward-reverse travel switching switch 28 is set to the reverse travel position RM, the motor 13 is driven in the direction of reverse travel. When the forward-reverse travel switching switch 28 is set to the forward travel position FM, the motor 13 is driven in the direction of forward travel. That is, the forward-reverse travel switching switch 28 is configured so as to be capable of operation input to switch between forward travel driving and reverse travel driving of the motor 13.

The accelerator pedal 29 shown in FIGS. 2 and 3 is configured so as to be operated by stepping on the pedal with a foot. The accelerator pedal 29 is biased so as to return to an initial position when the foot is removed.

The brake pedal 30 shown in FIGS. 2 and 3 is configured so as to be operated by stepping on the pedal with a foot. The brake pedal 30 is biased so as to return to an initial position when the foot is removed. By the operator performing stepping operation of the brake pedal 30, an unshown brake mechanism is operated, and thus braking force acts on the front wheels 19 and the rear wheels 18.

As shown in FIGS. 2 and 3, additionally provided in the traveling machine body are, for example, an electrical power generator 33 capable of generating alternating current based on driving of the engine 12, a battery 34, a remaining amount sensor 35 that detects a remaining amount of charge of the battery 34, an inverter/converter apparatus 36 capable of converting direct current of the battery 34 to alternating current and supplying this current to the motor 13, and a speed sensor 37 that detects rotational speed of the rear wheels 18. The inverter/converter apparatus 36 also has a function of converting alternating current based on driving of the electrical power generator 33, and alternating current based on driving of the motor 13, to direct current, and charging the battery 34 with this direct current.

Control Configuration and Respective Modes

Figure 4:
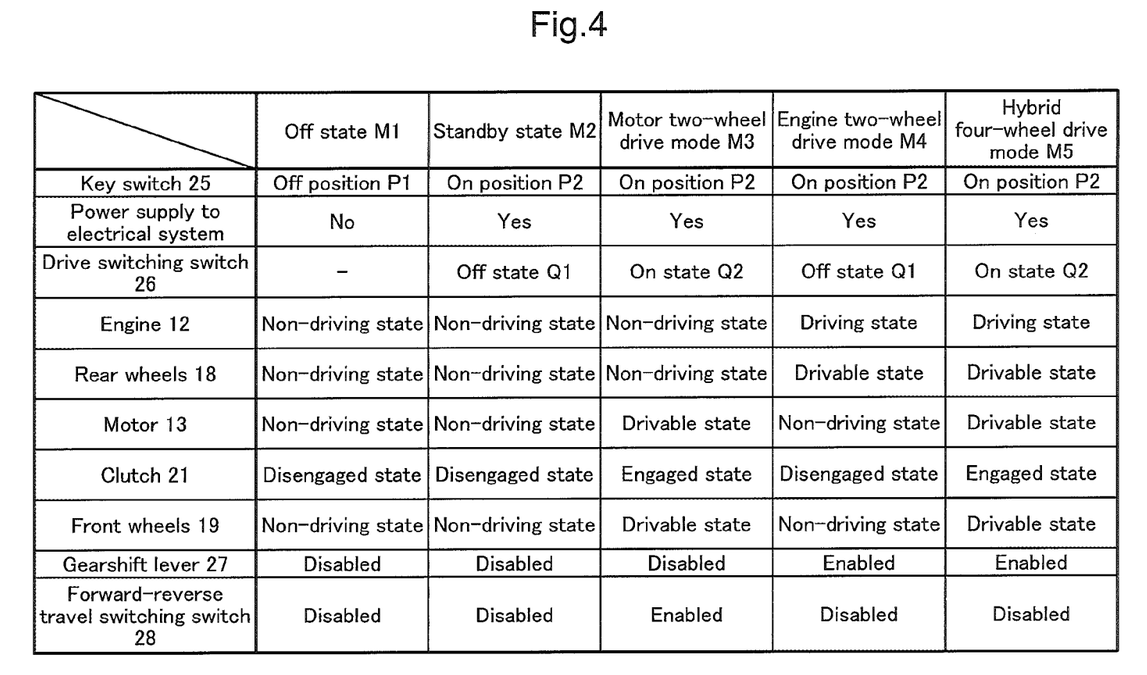
FIG. 4 is a table showing states in various modes.
Figure 5:
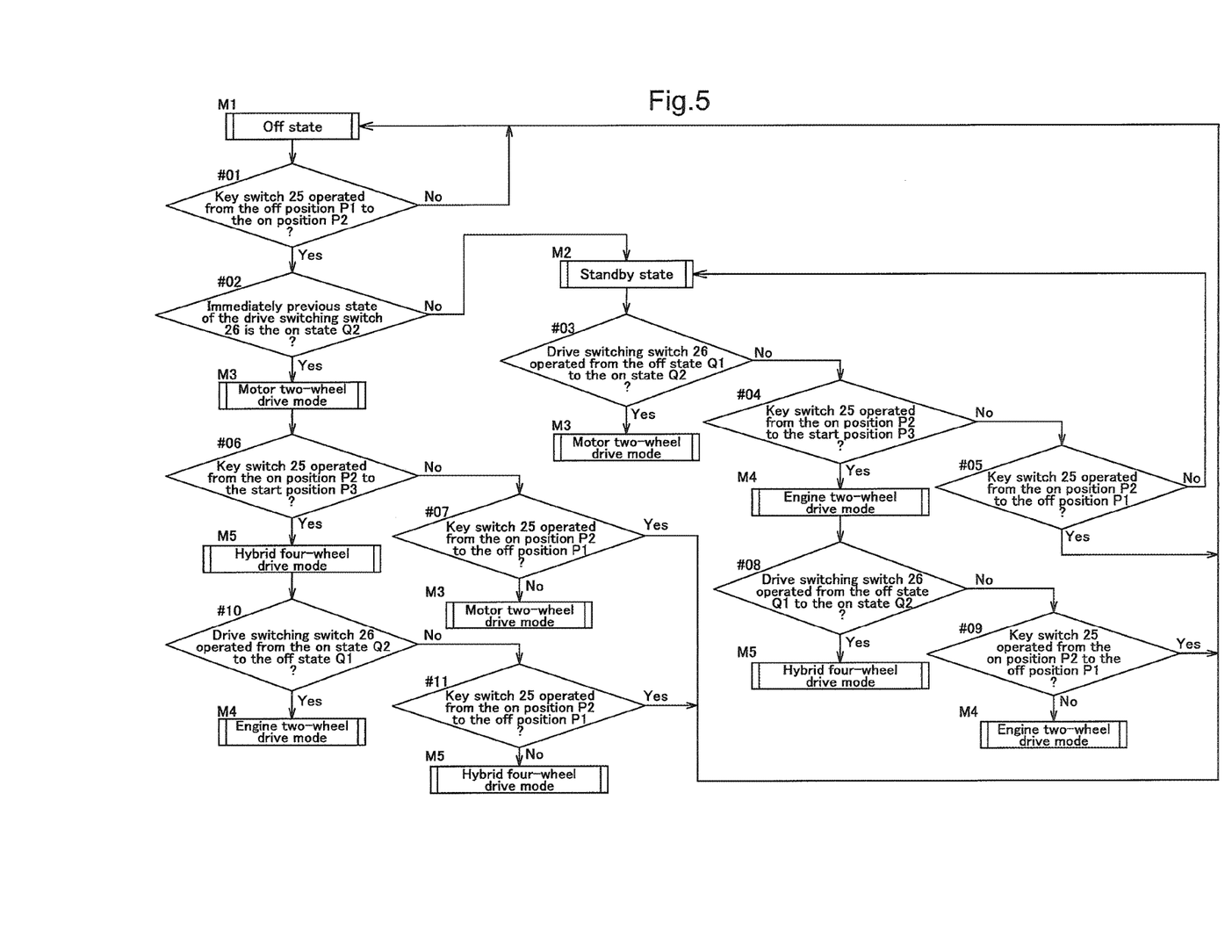
FIG. 5 is a flowchart illustrating changes between modes.

The control apparatus 17 shown in FIG. 3 is configured with an ECU (Electronic Control Unit). As shown in FIGS. 4 and 5, the control apparatus 17 is configured so as to be capable of switching the state of the traveling machine body to an off state M1 in which electrical power is not supplied to the electrical system, a standby state M2 in which electrical power is supplied to the electrical system, an engine two-wheel drive mode M4 in which only the engine 12 (only the rear wheels 18) are driven, a motor two-wheel drive mode M3 in which only the motor 13 (only the front wheels 19) are driven, and a hybrid four-wheel drive mode M5 in which both the engine 12 and the motor 13 (the rear wheels 18 and the front wheels 19) are driven.

Off State

As shown in FIG. 4, when the key switch 25 is in the off position P1, the state of the traveling machine body is set to the off state M1. In the off state M1, electrical power is not supplied to the electrical system, and the engine 12 and the motor 13 are set to a non-driving state. The clutch 21 is set to a disengaged state. That is, the rear wheels 18 and the front wheels 19 are set to a non-driving state. Also, operation of the gearshift lever 27 and operation of the forward-reverse travel switching switch 28 are disabled. Also, in the off state M1, operation of the drive switching switch 26 also is disabled.

As shown in FIG. 5, in the off state M1, it is determined whether or not the key switch 25 has been operated from the off position P1 to the on position P2 (step #01). When determined in step #01 that the key switch 25 has been operated from the off position P1 to the on position P2 (step #01: Yes), electrical power is supplied to the electrical system, and next, it is determined whether or not the immediately previous state of the drive switching switch 26 is the on state Q2 (step #02). On the other hand, when determined in step #01 that the key switch 25 remains in the off position P1 (step #01: No), the state of the traveling machine body is maintained in the off state M1. Note that information regarding whether the immediately previous state of the drive switching switch 26 is the off state Q1 or the on state Q2 is stored in the control apparatus 17.

When determined in step #02 that the immediately previous state of the drive switching switch 26 is the off state Q1 (step #02: No), the state of the traveling machine body changes to the standby state M2.

Standby State

As shown in FIG. 4, in the standby state M2, the key switch 25 is set to the on position P2, and electrical power is supplied to the electrical system, but the engine 12 and the motor 13 are set to a non-driving state. The clutch 21 is set to a disengaged state. That is, the rear wheels 18 and the front wheels 19 are set to a non-driving state. Also, operation of the gearshift lever 27 and operation of the forward-reverse travel switching switch 28 are disabled.

As shown in FIG. 5, in the standby state M2, it is determined whether or not the drive switching switch 26 has been operated from the off state Q1 to the on state Q2 (step #03). When determined in step #03 that the drive switching switch 26 remains in the off state Q1 (step #03: No), next, it is determined whether or not the key switch 25 has been operated from the on position P2 to the start position P3 (step #04). When determined in step #04 that the key switch 25 remains in the on position P2 (step #04: No), next, it is determined whether or not the key switch 25 has been operated from the on position P2 to the off position P1 (step #05). When determined in step #05 that the key switch 25 has been operated from the on position P2 to the off position P1 (step #05: Yes), the state of the traveling machine body changes to the off state M1. On the other hand, when determined in step #05 that the key switch 25 remains in the on position P2 (step #05: No), the state of the traveling machine body is maintained in the standby state M2.

When determined in step #03 that the drive switching switch 26 has been operated from the off state Q1 to the on state Q2 (step #03: Yes), the state of the traveling machine body changes to the motor two-wheel drive mode M3. Also, when determined in step #02 that the immediately previous state of the drive switching switch 26 is the on state Q2 (step #02: Yes), the state of the traveling machine body changes to the motor two-wheel drive mode M3.

Motor Two-Wheel Drive Mode

As shown in FIG. 4, the motor two-wheel drive mode M3 is a mode in which the engine 12 is not driven, only the motor 13 is driven, in other words an EV (Electric Vehicle) mode. In the motor two-wheel drive mode M3, the key switch 25 is set to the on position P2, and the drive switching switch 26 is set to the on state Q2. In the motor two-wheel drive mode M3, electrical power is supplied to the electrical system, the engine 12 is set to a non-driving state, and the motor 13 is set to a drivable state. The clutch 21 is set to an engaged state. That is, the rear wheels 18 are in a non-driving state, and the front wheels 19 are in a drivable state. Operation of the gearshift lever 27 is disabled, and operation of the forward-reverse travel switching switch 28 is enabled.

In the motor two-wheel drive mode M3, as understood from FIGS. 2, 3, 6, and the like, when the operator operates the forward-reverse travel switching switch 28 to the forward travel position FM, and operates the accelerator pedal 29 by stepping on the pedal, according to the amount of stepping on the accelerator pedal 29, electrical power is supplied from the inverter/converter apparatus 36 to the motor 13, the rotational speed of the motor 13 changes and the motor 13 is driven forward, and so the front wheels 19 are driven forward. On the other hand, when the operator operates the forward-reverse travel switching switch 28 to the reverse travel position RM, and operates the accelerator pedal 29 by stepping on the pedal, according to the amount of stepping on the accelerator pedal 29, electrical power is supplied from the inverter/converter apparatus 36 to the motor 13, the rotational speed of the motor 13 changes and the motor 13 is driven in reverse, and so the front wheels 19 are driven in reverse. That is, the forward-reverse travel switching switch 28 is configured so as to be capable of operation input of switching between forward travel driving and reverse travel driving of the motor 13 in the motor two-wheel drive mode M3.

As shown in FIG. 5, in the motor two-wheel drive mode M3, it is determined whether or not the key switch 25 has been operated from the on position P2 to the start position P3 (step #06). When determined in step #06 that the key switch 25 remains in the on position P2 (step #06: No), next, it is determined whether or not the key switch 25 has been operated from the on position P2 to the off position P1 (step #07). When determined in step #07 that the key switch 25 has been operated from the on position P2 to the off position P1 (step #07: Yes), the state of the traveling machine body changes to the off state M1. On the other hand, when determined in step #07 that the key switch 25 remains in the on position P2 (step #07: No), the state of the traveling machine body is maintained in the motor two-wheel drive mode M3.

When determined in step #04 that the key switch 25 has been operated from the on position P2 to the start position P3 (step #04: Yes), the state of the traveling machine body changes to the engine two-wheel drive mode M4.

Engine Two-Wheel Drive Mode

As shown in FIG. 4, the engine two-wheel drive mode M4 is a mode in which the motor 13 is not driven, only the engine 12 is driven. In the engine two-wheel drive mode M4, the key switch 25 is set to the on position P2, and the drive switching switch 26 is set to the off state Q1. In the engine two-wheel drive mode M4, electrical power is supplied to the electrical system, the motor 13 is set to a non-driving state, and the engine 12 is set to a driving state. The clutch 21 is set to a disengaged state. That is, the front wheels 19 are in a non-driving state, and the rear wheels 18 are in a drivable state. Operation of the forward-reverse travel switching switch 28 is disabled, and operation of the gearshift lever 27 is enabled.

In the engine two-wheel drive mode M4, as understood from FIGS. 2, 3, 6, and the like, when the operator operates the gearshift lever 27 to the low gear forward position L or the high gear forward position H, and operates the accelerator pedal 29 by stepping on the pedal, according to the amount of stepping on the accelerator pedal 29, the rotational speed of the engine 12 changes, and the rear wheels 18 are driven forward. On the other hand, when the operator operates the gearshift lever 27 to the reverse travel position R, and operates the accelerator pedal 29 by stepping on the pedal, according to the amount of stepping on the accelerator pedal 29, the rotational speed of the engine 12 changes, and the rear wheels 18 are driven in reverse.

In the engine two-wheel drive mode M4, the inverter/converter apparatus 36 converts alternating current generated from rotational driving of the electrical power generator 33 (see FIG. 2) based on driving of the engine 12 to direct current, and charges the battery 34.

As shown in FIG. 5, in the engine two-wheel drive mode M4, it is determined whether or not the drive switching switch 26 has been operated from the off state Q1 to the on state Q2 (step #08). When determined in step #08 that the drive switching switch 26 remains in the off state Q1 (step #08: No), next, it is determined whether or not the key switch 25 has been operated from the on position P2 to the off position P1 (step #09). When determined in step #09 that the key switch 25 has been operated from the on position P2 to the off position P1 (step #09: Yes), the state of the traveling machine body changes to the off state M1. On the other hand, when determined in step #09 that the key switch 25 remains in the on position P2 (step #09: No), the state of the traveling machine body is maintained in the engine two-wheel drive mode M4.

When determined in step #06 that the key switch 25 has been operated from the on position P2 to the start position P3 (step #06: Yes), the state of the traveling machine body changes to the hybrid four-wheel drive mode M5. Also, when determined in step #08 that the drive switching switch 26 has been operated from the off state Q1 to the on state Q2 (step #08: Yes), the state of the traveling machine body changes to the hybrid four-wheel drive mode M5.

Hybrid Four-Wheel Drive Mode

As shown in FIG. 4, the hybrid four-wheel drive mode M5 is a mode in which the engine 12 and the motor 13 are both driven. In the hybrid four-wheel drive mode M5, the key switch 25 is set to the on position P2, and the drive switching switch 26 is set to the on state Q2. In the hybrid four-wheel drive mode M5, electrical power is supplied to the electrical system, the engine 12 is in a driving state, and the motor 13 is in a drivable state. The clutch 21 is set to an engaged state. That is, the rear wheels 18 and the front wheels 19 are both in a drivable state. Operation of the forward-reverse travel switching switch 28 is disabled, and operation of the gearshift lever 27 is enabled.

In the hybrid four-wheel drive mode M5, as understood from FIGS. 2, 3, 6, and the like, when the operator operates the gearshift lever 27 to the low gear forward position L or the high gear forward position H, and operates the accelerator pedal 29 by stepping on the pedal, according to the amount of stepping on the accelerator pedal 29, rotational speed of the engine 12 changes, and the rear wheels 18 are driven forward. On the other hand, when the operator operates the gearshift lever 27 to the reverse travel position R, and operates the accelerator pedal 29 by stepping on the pedal, according to the amount of stepping on the accelerator pedal 29, the rotational speed of the engine 12 changes, and the rear wheels 18 are driven in reverse.

When, along with this, the operator operates the gearshift lever 27 to the low gear forward position L or the high gear forward position H, and operates the accelerator pedal 29 by stepping on the pedal, after the ratio of electrical power supplied from the inverter/converter apparatus 36 to the motor 13 according to the amount of stepping on the accelerator pedal 29 has changed according to whether the low gear forward position L or the high gear forward position H is set, predetermined electrical power is supplied to the motor 13, the rotational speed of the motor 13 changes and the motor 13 is driven forward, so the front wheels 19 are driven forward. On the other hand, when the operator operates the gearshift lever 27 to the reverse travel position R and operates the accelerator pedal 29 by stepping on the pedal, according to the amount of stepping on the accelerator pedal 29, predetermined electrical power is supplied to the motor 13, the rotational speed of the motor 13 changes and the motor 13 is driven in reverse, so the front wheels 19 are driven in reverse. In this way, in the hybrid four-wheel drive mode M5, when the operator operates the gearshift lever 27, the transmission apparatus 14 is operated, and the driving state of the motor 13 changes. That is, the control apparatus 17 is configured so as to perform switching of forward travel driving and reverse travel driving of the motor 13 based on operation of the gearshift lever 27 in the hybrid four-wheel drive mode M5.

In the hybrid four-wheel drive mode M5, based on a rotational speed detected by the speed sensor 37 (see FIGS. 2 and 3) that detects rotational speed of the rear wheels 18 through the rear axles 20, the rotational speed of the motor 13 is controlled by the control apparatus 17 such that the rotational speed of the rear wheels 18 is synchronized with the rotational speed of the front wheels 19.

Also, in the hybrid four-wheel drive mode M5, the inverter/converter apparatus 36 converts alternating current generated from rotational driving of the electrical power generator 33 (see FIG. 2) based on driving of the engine 12 to direct current, and charges the battery 34. Also, in the hybrid four-wheel drive mode M5, the inverter/converter apparatus 36, by utilizing the motor 13 for regenerative braking, is able to convert alternating current generated from rotational driving of the motor 13 based on driving of the front wheels 19 to direct current, and thus charge the battery 34.

As shown in FIG. 5, in the hybrid four-wheel drive mode M5, it is determined whether or not the drive switching switch 26 has been operated from the on state Q2 to the off state Q1 (step #10). When determined in step #10 that the drive switching switch 26 has been operated from the on state Q2 to the off state Q1 (step #10: Yes), the state of the traveling machine body changes to the engine two-wheel drive mode M4. On the other hand, when determined in step #10 that the drive switching switch 26 remains in the on state Q2 (step #10: No), next, it is determined whether or not the key switch 25 has been operated from the on position P2 to the off position P1 (step #11). When determined in step #11 that the key switch 25 has been operated from the on position P2 to the off position P1 (step #11: Yes), the state of the traveling machine body changes to the off state M1. On the other hand, when determined in step #11 that the key switch 25 remains in the on position P2 (step #11: No), the state of the traveling machine body is maintained in the hybrid four-wheel drive mode M5.

As described above, in the engine two-wheel drive mode M4, when the operator operates the accelerator pedal 29 by stepping on the pedal, the rotational speed of the engine 12 is changed. Also, in the motor two-wheel drive mode M3, when the operator operates the accelerator pedal 29 by stepping on the pedal, the rotational speed of the motor 13 is changed. Also, in the hybrid four-wheel drive mode M5, when the operator operates the accelerator pedal 29 by stepping on the pedal, the rotational speeds of the engine 12 and the motor 13 are changed. That is, the accelerator pedal 29 is configured such that it is possible to input operation to change the rotational speed of at least one of the engine 12 and the motor 13.

Also, in the motor two-wheel drive mode M3 and the hybrid four-wheel drive mode M5, it is successively determined whether or not the remaining amount of the charge of the battery 34 is insufficient based on detection by the remaining amount sensor 35 (see FIGS. 2 and 3). When determined that the remaining amount of the battery 34 is insufficient, the motor 13 is forcibly set to a non-driving state. Afterward, it is determined whether or not the remaining amount of the charge of the battery 34 has recovered based on detection by the remaining amount sensor 35, and when determined that the remaining amount of the charge of the battery 34 has recovered, the forcible non-driving state of the motor 13 is released.

Disposition of Forward-Reverse Travel Switching Switch

As shown in FIG. 6, the forward-reverse travel switching switch 28 is provided at a location on the opposite side in the left-right direction as the gearshift lever 27, relative to the steering wheel 24. Explained further, the forward-reverse travel switching switch 28 and the gearshift lever 27 are disposed divided on left and right sides of a center C in the left-right direction of the steering wheel 24. The center C in the left-right direction of the steering wheel 24 is positioned displaced to the left side in the direction of forward travel from the center in the left-right direction of the traveling machine body. Also, the key switch 25 is disposed on the right side in the direction of forward travel, which is the same side as the gearshift lever 27, relative to the center C in the left-right direction of the steering wheel 24. Also, the drive switching switch 26 is disposed on the left side in the direction of forward travel, which is the same side as the forward-reverse travel switching switch 28, relative to the center C in the left-right direction of the steering wheel 24. In this way, the operating system with respect to the engine 12 and the operating system with respect to the motor 13, by being disposed divided on left and right sides of the center C in the left-right direction of the steering wheel 24, can be caused to have a different feeling of operation in the engine two-wheel drive mode M4 and the motor two-wheel drive mode M3.

Second Embodiment

Following is a description of a second embodiment in which changes have been added to the above first embodiment. In the second embodiment, the 'forward-reverse travel switching means' of the first embodiment is changed, and other aspects of the configuration are the same as in the configuration of the first embodiment.

Figure 7:
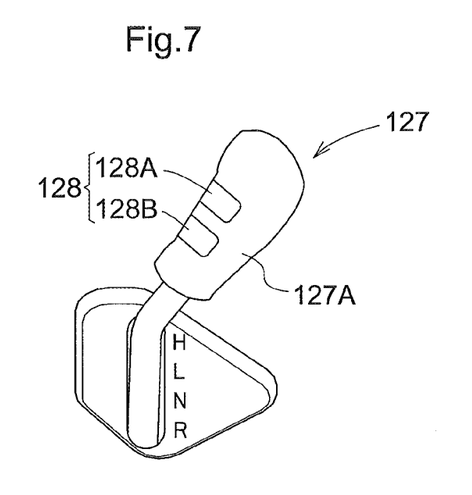
FIG. 7 is a back view showing the arrangement of a forward-reverse travel drive switching switch and the like in a second embodiment.

In the second embodiment, as shown in FIG. 7, a forward-reverse travel switching button apparatus 128 (an example of a 'forward-reverse travel switching means') is provided in a grip unit 127A of a gearshift lever 127. The forward-reverse travel switching button apparatus 128 is positioned in a lower part of a bulging portion at an upper end within the grip unit 127A of the gearshift lever 127. The forward-reverse travel switching button apparatus 128 is configured so as to be capable of operation with a thumb of a hand that operates the grip unit 127A of the gearshift lever 127. The forward-reverse travel switching button apparatus 128, like the forward-reverse travel switching switch 28 of the above-described first embodiment, is operated in the motor two-wheel drive mode M3. A forward travel button 128A and a reverse travel button 128B are provided in a row in the forward-reverse travel switching button apparatus 128. The function of the forward travel button 128A is similar to when performing operation in the forward travel position FM of the forward-reverse travel switching switch 28 of the above-described first embodiment. Also, the function of the reverse travel button 128B is similar to when performing operation in the reverse travel position RM of the forward-reverse travel switching switch 28 of the above-described first embodiment. That is, when the forward travel button 128A is pressed, the motor 13 is driven forward. On the other hand, when the reverse travel button 128B is pressed, the motor 13 is driven in reverse.

Third Embodiment

Following is a description of a third embodiment in which changes have been added to the above first embodiment. In the third embodiment, changes of the 'forward-reverse travel switching means' of the first embodiment are added, and other aspects of the configuration are the same as in the configuration of the first embodiment.

Figure 8:
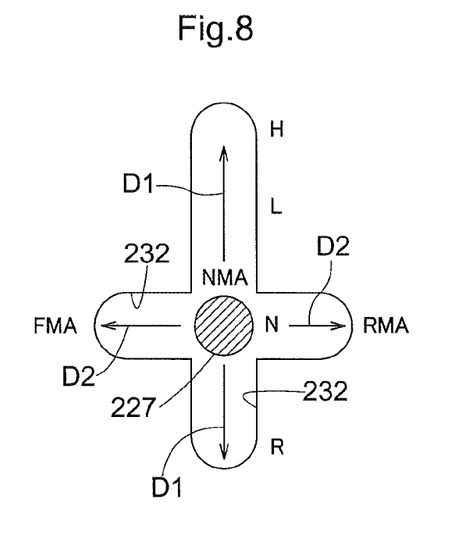
FIG. 8 is a back view showing the arrangement of a forward-reverse travel drive switching switch and the like in a third embodiment.

In the third embodiment, as shown in FIG. 8, a lever guide groove 232 that guides a gearshift lever 227 is plus-shaped. A configuration is adopted such that, in the engine two-wheel drive mode M4, gearshifting of the transmission apparatus 14 is performed by a movement operation in a first direction D1 of the gearshift lever 227. On the other hand, a configuration is adopted such that, in the motor two-wheel drive mode M3, the gearshift lever 227 functions as a 'forward-reverse travel switching means', and switching between forward travel driving and reverse travel driving of the motor 13 is performed by a movement operation in a second direction D2 orthogonal to the first direction D1 of the gearshift lever 227. In the motor two-wheel drive mode M3, a forward travel position FMA and a reverse travel position RMA are disposed divided on the left and right sides with a neutral position NMA in the center. A neutral position N for a gearshift in the transmission apparatus 14, and the neutral position NMA for driving of the motor 13, are at the same position. Also, a configuration is adopted such that in the hybrid four-wheel drive mode M5, a gearshift of the transmission apparatus 14, and switching between forward travel driving and reverse travel driving of the motor 13, are performed by a movement operation in the first direction D1 of the gearshift lever 227.

Other Embodiments

Following is a description of other embodiments in which changes have been added to the first to third embodiments. The first to third embodiments, and the other embodiments, can be selectively combined in a manner consistent with those embodiments. Note that the scope of the present invention is not limited by the content of the embodiments.

(1) In the above-described first to third embodiments, an example is given in which the 'front travel apparatuses' are the left-right pair of front wheels 19, and the 'rear travel apparatuses' are the left-right pair of rear wheels 18, but this is not a limitation. For example, at least one of the pair of 'front travel apparatuses' and the pair of 'rear travel apparatuses' may be a left-right pair of crawler travel apparatuses.

(2) In the above-described first to third embodiments, an example is given in which the engine 12 is configured so as to be capable of driving the rear wheels 18 that are the pair of 'rear travel apparatuses', and the motor 13 is configured so as to be capable of driving the front wheels 19 that are the pair of 'front travel apparatuses', but this is not a limitation. For example, a configuration may be adopted in which the engine 12 is capable of driving the front wheels 19 that are the pair of 'front travel apparatuses', and in which the motor 13 is capable of driving the rear wheels 18 that are the pair of 'rear travel apparatuses'.

That is, a configuration can be adopted in which the engine 12 is capable of driving first travel apparatuses being one of the pair of front wheels 19 and the pair of rear wheels 18, and the motor 13 is capable of driving second travel apparatuses being the other of the pair of front wheels 19 and the pair of rear wheels 18.

(3) In the above-described first to third embodiments, the accelerator pedal 29 operated by the operator stepping on the pedal with a foot is given as an example of an 'accelerator operation tool', but this is not a limitation. For example, another 'accelerator operation tool', such as an accelerator lever operated by the operator with a hand, may be adopted.

What is claimed is:

1. A utility vehicle, comprising:
    a travel unit having a left-right pair of front travel apparatuses and a left-right pair of rear travel apparatuses;
    an engine capable of driving first travel apparatuses being one of the pair of front travel apparatuses and the pair of rear travel apparatuses;
    a motor capable of driving second travel apparatuses being the other of the pair of front travel apparatuses and the pair of rear travel apparatuses;
    a transmission apparatus capable of performing a gearshift of driving force of the engine and transmitting the driving force to the first travel apparatuses;
    an accelerator operation tool capable of operation to input a change in rotational speed of at least one of the engine and the motor;
    a key switch capable of operation to input driving and stoppage of the engine;
    a drive switching switch capable of operation input commands to drive and stop the motor;
    a gearshift lever capable of operation input to perform a gearshift of the transmission apparatus; and
    a forward-reverse travel switching means capable of operation input to switch between forward travel driving and reverse travel driving of the motor in the motor two-wheel drive mode; and
    a control apparatus capable of switching between an engine two-wheel drive mode in which only the engine is driven, a motor two-wheel drive mode in which only the motor is driven, and a hybrid four-wheel drive mode in which the engine and the motor are both driven.

2. The utility vehicle according to claim 1, wherein the control apparatus is configured so as to perform switching between forward travel driving and reverse travel driving of the motor based on operation of the gearshift lever in the hybrid four-wheel drive mode.

3. The utility vehicle according to claim 1, comprising a steering wheel capable of operation input of steering of the travel unit, wherein the forward-reverse travel switching means is provided at a location on the opposite side in the left-right direction as the gearshift lever, relative to the steering wheel.

4. The utility vehicle according to claim 1, wherein the forward-reverse travel switching means is provided in a grip unit of the gearshift lever.

5. The utility vehicle according to claim 1, wherein in the engine two-wheel drive mode, a gearshift of the transmission apparatus is performed by a movement operation in a first direction of the gearshift lever, and
    in the motor two-wheel drive mode, the gearshift lever functions as the forward-reverse travel switching means, and switching between forward travel driving and reverse travel driving of the motor is performed by a movement operation in a second direction orthogonal to the first direction of the gearshift lever.

* * * * *